May 17, 1932.  C. G. ERICKSON  1,858,544
CALIPER
Filed Oct. 4, 1928
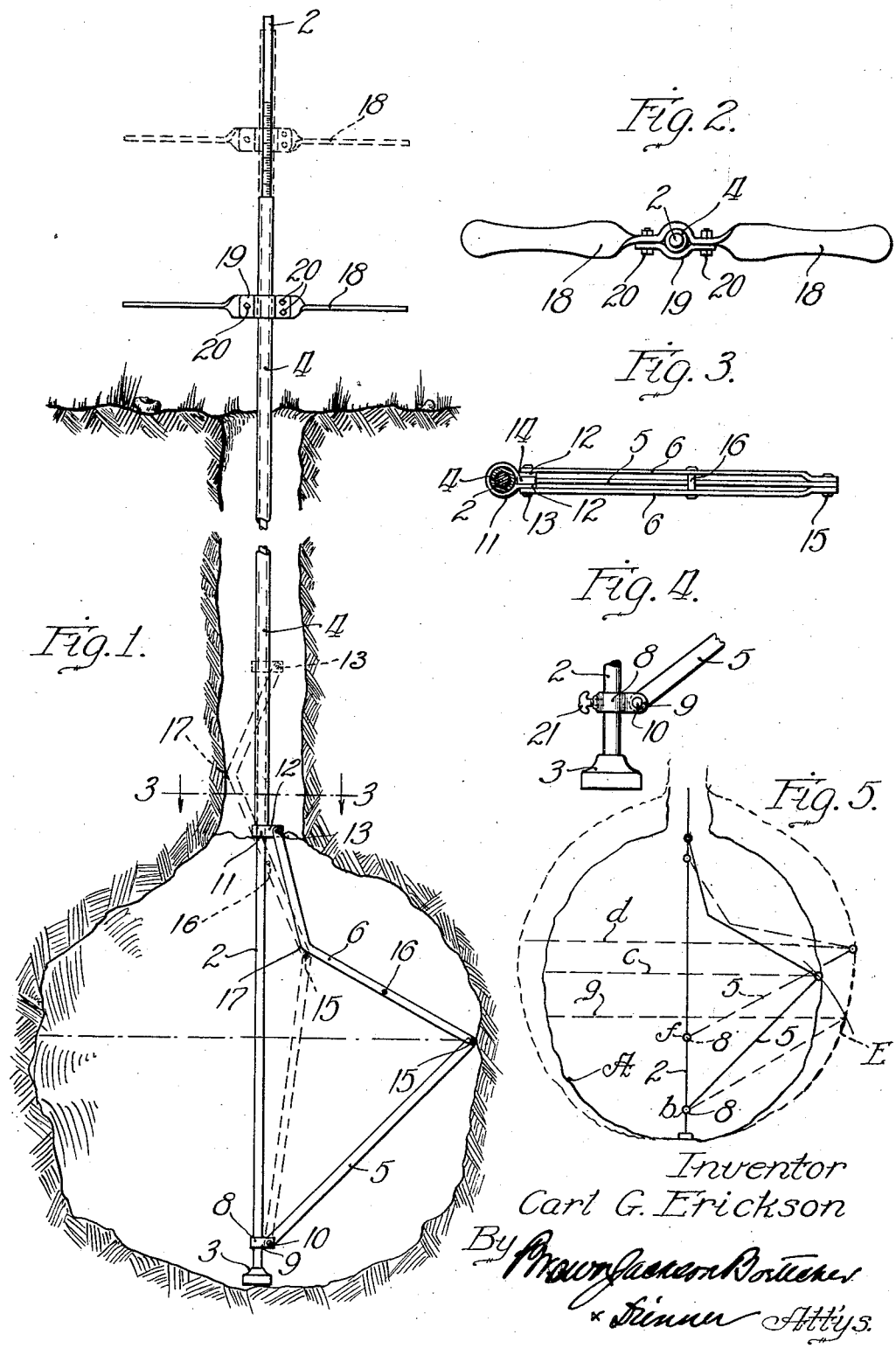
Inventor
Carl G. Erickson Patented May 17, 1932

1,858,544

UNITED STATES PATENT OFFICE

CARL G. ERICKSON, OF EVANSTON, ILLINOIS

CALIPER

Application filed October 4, 1928. Serial No. 310,407.

This invention pertains to measuring instruments in general, but more particularly to measuring instruments for measuring the size and contour of cavities to which access is had through a relatively small opening.

In the laying of certain kinds of anchoring devices, the cavity for the concrete foundation thereof is formed by boring a hole in the earth several feet deep and of relatively small diameter, and then exploding a charge of dynamite at the bottom thereof. The force of the explosion causes the formation of a substantially spherically shaped enlargement at the bottom of the hole, without disturbing the earth around the hole near the surface. While the size and shape of a cavity formed this way in earth of a certain given character by a certain charge is fairly uniform, cavities made in the field in this manner may vary, due to the variation in the character of the soil.

To obtain the desired foundation, it is important that the cavity at the end of the hole be equal to or greater than a certain minimum size.

By my invention, I provide a measuring device particularly adapted for use in determining the approximate size and shape of a cavity of this kind, though of course its use is not limited thereto.

To acquaint those skilled in the art with the manner of constructing and using a device embodying the principles of my invention, I shall describe in connection with the accompanying drawings one specific embodiment thereof.

In the drawings:

Fig. 1 is a side view of the measuring instrument shown in a cavity the size of which is to be determined. The dotted lines in this figure indicate the normal closed position of the instrument, the position in which the instrument must be placed to lower the same in the opening of the cavity;

Fig. 2 is a top view of the upper portion of the instrument showing the construction and the manner of attachment of the handle;

Fig. 3 is a cross sectional view along the line 3—3 of Fig. 1;

Fig. 4 is a fragmentary view of a modified form of the measuring instrument; and, Fig. 5 is a diagrammatic sketch showing the principle of operation of the modified form.

The measuring instrument comprises essentially a stationary element and a moving element. The stationary element consists of a long straight rod 2 calibrated on its upper end and having at its lower end a shaped washer 3 threaded or welded thereto to act as a foot rest for the instrument. If desired, this foot rest may be movably secured to the rod 2 as by means of a ball and socket joint.

The moving element comprises a long pipe 4 which slides over the rod 2, two arms 5 and 6 pivoted to each other at one end and to the rod 2 and the pipe 4 at the other end, respectively, and a handle 18 fastened to the pipe 4 for sliding the pipe on the rod.

The handle 18 is formed from a single flat piece of material having a semi-cylindrical indenture in the center to fit around the pipe 4 and is secured to the pipe 4 by means of the plate 19 also having a semi-cylindrical shaped indenture to fit the pipe 4, the plate clamping the handle 18 to the pipe 4 by means of bolts and nuts 20. The two ends of the handle 18 are shaped to form suitable grips.

The arm 5 consists of a single straight bar. its lower end is pivoted to the rod 2 by means of a collar 8 which fits around the rod 2 near the lower end of the rod and is permanently secured thereto as by welding. The collar has two perforated lugs 9 between which the arm 5 is pivoted by means of the pivot 10 which passes through the perforations in the lugs 9 and through a suitable hole in the bar 5.

The arm 6 is comprised of two similar members the upper ends of which are pivoted to the pipe 4 by means of the collar 11 which fits around the lower end of the pipe 4 and is permanently secured thereto as by welding. The collar 11 has two perforated lugs 12 to which the members of the arm 6 are pivoted by means of a pivot 13 passing through the perforations in the lugs 12 and through suitable holes in the members of arm 6, the members of arm 6 being positioned on the outside of the two lugs 12. The space between the two lugs 12 is taken up by a suitable filler 14.

The upper end of the arm 5 and the lower end of the members of arm 6 are pivoted together by means of the pivot 15 which passes through suitable holes in the members of the arm 6 and in the arm 5. The lower ends of the members of the bar 6 are bent together slightly so that the distance between them will just accommodate the bar 5.

The arm 6 is not a straight arm; instead its upper approximately one third portion is angularly displaced at the elbow 17 with respect to its lower portion. A stop pin 16, which also serves as a spacer to add rigidity to the arm 6, is positioned between the two members of arm 6 about midway between the elbow 17 and the lower end of the arm (being just enough below the midway point to compensate for its own thickness and the thickness of rod 2 so that when it engages the rod 2, the pivot 15 and elbow 17 will be approximately equidistant from the center line of the rod). The ends of pin 16 are smaller than the middle portion, and fit holes provided therefor in the members of arm 6, and are riveted or welded to the members.

The purpose of the elbow in the arm 6 in connection with the stop pin 16 is twofold. When the pipe 4 is slid along the rod 2 towards the upper end of the rod to the normal closed position in which the instrument is carried and the position in which the instrument must be put in order to lower the same in a hole, this position being indicated by dotted lines in Fig. 1, the two members of the arm 6 straddle the rod 2, rotating about the pivot 13 in a clockwise direction until the stop pin 16 strikes the rod 2. Since the stop pin 16 is approximately midway between the elbow 17 and the end of the arm 6, the elbow 17 will be about the same distance from the rod 2 as the pivot 15. The dimensions of arm 6 are so chosen that when the instrument is in its normal closed position, the horizontally projected distance between the elbow 17 and the pivot 15 will be approximately equal to the diameter of the bored hole. Therefore, when the device is lowered into the hole, the rod 2 will be guided down through the center of the hole, so that the instrument when it strikes the bottom of the cavity will be in the center of the cavity. With the instrument placed substantially in the center of the cavity a more accurate determination of its size and shape can be made.

Another result obtained by reason of the elbow in the arm 6 and the position of the stop pin 16 is that the instrument can not be closed to a point where a downward force exerted on the pipe 4 does not have an outward component on the arm 5.

Therefore, the device may at all times be opened very easily from its normal closed position. If it were not for the stop pin 16 the pipe 4 could be drawn up to a point where the arm 5 would rest against the rod 2. A straight downward force on arm 5 would then have little or no outward component, and as a result it might be troublesome to open the instrument.

The stop pin 16 also serves to limit the movement of pipe 4 downwardly on the rod 2. This is accomplished when the pin 16 engages the arm 5, at which time the arm 5 and adjacent portion of the arm 6 are both substantially horizontal.

To measure the size of a cavity of the kind described, the instrument is placed in its normal closed position, the position shown by dotted lines in Fig. 1, and then lowered into the opening of a cavity until the foot rest 3 rests on the bottom of the cavity. By means of the handle 18, the moving element is then moved downward until the reading on the calibrated scale is that which indicates the minimum sized hole, and with the moving element held in this position, the instrument is whirled around through 360 degrees. If this can be done without the arm 5 striking at any point, the cavity is equal to or greater than is necessary, and no further measurement need be made. If the arm 5 strikes the side of the cavity before the moving element has been lowered to give the reading which indicates the minimum sized hole, or if the arm strikes at any point when attempting to whirl it around, it is an indication that the cavity is too small, in which case an additional charge is exploded in the cavity to enlarge it.

When shooting holes in non-homogeneous soil, the cavity formed by a given charge, while having sufficient volumetric displacement, may be very irregular in shape. In such case it may be desirable to take several readings around the circumference of the hole by lowering the moving element until the upper end of arm 5 does strike the inside surface of the cavity and noting the reading on the calibrated scale. After taking one reading, the handle 18 may be pulled upward and given a slight twisting motion which causes the device to rotate on its foot rest 3 through a small angle at which point another reading may be taken. From the number of readings taken around the circumference of the cavity, a fair determination of the shape and size of the cavity can be made.

In Figure 4, I show a fragmentary view of a somewhat modified form of my device in which the collar 8 instead of being permanently fastened to the rod 2 is movable up and down the rod 2 and may be set at any position along the rod by means of the set screw 21. By setting the collar 8 at a lower position or a higher position a smaller or a larger hole can be measured on a great circle thereof. If the device is to be used to measure holes of one size, the collar will be set in one position, whereas if the device is to be used to measure holes of much larger size, the collar will be set at a higher position.

The effect of adjusting the collar 8 is diagrammatically indicated in Fig. 5. To measure a cavity of the size A, the collar is set at position $b$ in order that the end of the rod 5 will give readings on a great circle $c$ around the cavity. However, in order to have the end of rod 5 give readings on the great circle $d$ when measuring a cavity of the size E, the collar 11 must be raised to the point $f$. If measurements of the cavity E were taken with the collar 8 at position $b$, the readings would be given on the lesser circle $g$, which obviously would not be as accurate as those given on the great circle $d$.

The position to which the collar 8 must be set for various size holes and the reading which indicates the proper size hole in any given case is easily determined and well known to the operator using the instrument.

I do not wish to be limited to the specific construction and use of my invention illustrated. Many other modifications will suggest themselves to those skilled in the art, all within the scope of my invention.

I claim:

1. In a measuring instrument, a rod, a movable member adapted to be moved with respect to said rod, two arms pivoted together, means pivoting one of said arms to said rod, the other arm being pivoted to said movable member and a stopper on one arm for limiting the movement of the movable member in both directions.

2. In a measuring instrument, a rod, a movable member adapted to be moved with respect to said rod, two arms pivoted together, means pivoting one of said arms to said rod, the other arm being pivoted to said movable member, one arm being so shaped that as the other arm is moved toward the rod after it has reached a certain position, a portion of the said one arm is moved away from the rod.

3. In a measuring instrument, a rod, a movable member adapted to be moved with respect to said rod, two arms pivoted together, means pivoting one of said arms to said rod, the other arm being pivoted to said movable member, one arm being so shaped that as the other arm is moved toward the rod after it has reached a certain position, a portion of the said one arm is moved away from the rod, and means for preventing further movement of the said other arm when the point on the said portion farthest away from the rod is substantially the same distance from the rod as the point on the said other arm farthest away from the rod.

4. In a measuring instrument, a rod, an adjustable collar on said rod, a movable member adapted to be moved with respect to said rod, two arms pivoted together and one pivoted to said collar and the other to said movable member, the mutually pivoted ends of said arms moving away from said rod as said movable member is moved in one direction on said rod and toward it when that member is moved in the opposite direction, and means carried by one of said arms for limiting said movements.

5. In a measuring instrument, a rod, an adjustable collar on said rod, a movable member adapted to be moved with respect to said rod, and two arms pivoted together and one pivoted to said collar and the other to said movable member, one arm comprising two spaced members, and a spacer between the two members and cooperating with the rod to limit the movement of the movable member.

In witness whereof, I hereunto subscribe my name this 28th day of September, 1928.

CARL G. ERICKSON.